United States Patent
Perla et al.

(10) Patent No.: US 7,451,394 B2
(45) Date of Patent: Nov. 11, 2008

(54) SYSTEM AND METHOD FOR DOCUMENT AND DATA VALIDATION

(75) Inventors: Jesse Perla, New York, NY (US); Oleg Dulin, Staten Island, NY (US); Vishvas T. Canaran, Jacksonville, FL (US)

(73) Assignee: Convergys CMG Utah, Salt Lake City, UT (US)

( * ) Notice: Subject to any disclaimer, the term of this patent is extended or adjusted under 35 U.S.C. 154(b) by 770 days.

(21) Appl. No.: 10/834,879

(22) Filed: Apr. 30, 2004

(65) Prior Publication Data

US 2005/0246159 A1 Nov. 3, 2005

(51) Int. Cl.
*G06F 17/00* (2006.01)
*G06F 9/45* (2006.01)

(52) U.S. Cl. ............ 715/234; 715/237; 715/249; 707/102; 717/143

(58) Field of Classification Search .......... 715/234, 715/264, 760, 200, 237, 250, 265, 273, 277; 707/102; 717/143, 144
See application file for complete search history.

(56) References Cited

U.S. PATENT DOCUMENTS

| | | | |
|---|---|---|---|
| 5,600,554 A | 2/1997 | Williams | |
| 5,842,182 A | 11/1998 | Bonner et al. | |
| 6,401,079 B1 | 6/2002 | Kahn et al. | |
| 6,411,938 B1 | 6/2002 | Gates et al. | |
| 6,567,821 B1 | 5/2003 | Polk | |
| 6,681,223 B1 * | 1/2004 | Sundaresan | 707/6 |
| 2002/0156769 A1 | 10/2002 | Polk | |
| 2002/0184148 A1 | 12/2002 | Kahn et al. | |
| 2002/0188542 A1 | 12/2002 | Zhang et al. | |
| 2004/0019542 A1 | 1/2004 | Fuchs et al. | |
| 2005/0086643 A1 * | 4/2005 | Shane | 717/124 |

FOREIGN PATENT DOCUMENTS

| | | |
|---|---|---|
| WO | WO01/25992 A1 | 4/2001 |
| WO | WO 0237388 | 5/2002 |
| WO | WO02/088873 A2 | 11/2002 |
| WO | WO03/038693 A2 | 5/2003 |

OTHER PUBLICATIONS

U.S. Appl. No. 10/870,731, filed Jun. 17, 2004; Wilbur.
Application for U.S. Appl. No. 10/870,731.
U.S. Appl. No. 10/834,880, filed Apr. 30, 2004; Canaran.
Application for U.S. Appl. No. 10/834,880.
Office Action dated Nov. 15, 2006 for U.S. Appl. No. 10/834,880.
Office Action dated Jun. 4, 2007 for U.S. Appl. No. 10/834,880.

(Continued)

*Primary Examiner*—Doug Hutton
*Assistant Examiner*—Maikhanh Nguyen
(74) *Attorney, Agent, or Firm*—William S. Morriss; Frost Brown Todd LLC

(57) ABSTRACT

An embodiment of the invention generally relates to a method of processing data. The method includes receiving a multi-language document and determining a profile associated with the multi-language document. The method also includes determining associated schemas and rule files with the profile and applying said associated schemas and rule files to the multi-language document.

9 Claims, 5 Drawing Sheets

OTHER PUBLICATIONS

U.S. Appl. No. 10/834,878, filed Apr. 30, 2004; Perla.
Application for U.S. Appl. No. 10/834,878.
Office Action dated Sep. 8, 2006 for U.S. Appl. No. 10/834,878.
Office Action dated May 30, 2007 for U.S. Appl. No. 10/834,878.
Office Action dated Sep. 7, 2007 for U.S. Appl. No. 10/834,878.
Office Action dated Nov. 29, 2007 for U.S. Appl. No. 10/834,878.
U.S. Appl. No. 10/419,463, filed Apr. 21, 2003; Wright.
Application for U.S. Appl. No. 10/419,463.
Office Action dated Oct. 15, 2007 for U.S. Appl. No. 10/419,463.
U.S. Appl. No. 09/632,948, filed Aug. 4, 2000; Schulte (Abandoned).
Application for U.S. Appl. No. 09/632,948.
Office Action dated Feb. 24, 2004 for U.S. Appl. No. 09/632,948.
Office Action dated Aug. 13, 2004 for U.S. Appl. No. 09/632, 948.
Notice of Abandonment dated Dec. 1, 2004 for U.S. Appl. No. 09/632,948.
Office Action dated Feb. 22, 2008 for U.S. Appl. No. 10/834,880.
Kamel, M.N. and Lutman, T.L.; "The Defense Manpower Data Center Pay Data Warehouse: Development and Lessons Learned," Navel Postgraduate Sch., Monterey, CA, USA Conference: Proceeeings 13th International Workshop on Database and Expert Systems Applications, p. 810-14 DEXA 2002.
Long, F.; "Getting Payroll Right!," *Irish Computer*, vol. 26, No. 8, p. 32-4 Publisher: Computer Publications of Ireland, Sep. 2002.
Sweet, P; "Perils of Payroll," *Conspectus*, p. 36-7 Publisher: Prime Marketing Publications, Jan. 2000.
Webster, C.; "Time Please," *Manufacturing Management*, vol. 9, No. 3, p. 36-40 Publisher: Inside Communications, Mar. 2000.
Author unknown, "Selven," *Conspectus*, p. 40 Publisher: Prime Marketing Publications, Jan. 2003.
Author unknown, "Brought to Account," *Mind Your Own Business*, vol. 26, No. 2, p. 47-8 Publisher: Market Place Publishing, Feb. 2003.

* cited by examiner

SYSTEM AND METHOD FOR DOCUMENT AND DATA VALIDATION

FIELD OF THE INVENTION

Embodiments of the present invention generally relate to document and data validation.

BACKGROUND OF THE RELATED ART

Various computer languages are well known in the art. For example, there are so-called "markup" languages that provide a method of adding information to text in a computer-displayed document indicating the logical components of the document, or that provide instructions for the layout of text on the page or other information that can be interpreted by a computer. A particular example of a markup language is the so-called Extensible Markup Language (XML) that, in essence, makes data self-describing. XML provides a standardized approach that allows programmers to surround information with markup (i.e., "tags") that describes what the data is, not just what it should look like or where it should be positioned. Using XML, documents can be created that are easily processed by computers that follow the relatively simple rules for interpreting XML "code". To this end, an XML parser (an algorithm or program to determine the syntactic structure of a sentence or string of symbols written in some language) can be used to break down an XML document into a representation that a computer can understand.

Schemas may be associated with mark-up language. Generally, a schema may be an abstract representation ob an object's characteristics and relationship to other objects. In other words, schemas provide metadata for the markup-language, i.e., data that describes other data. For example an XML schema may represent the interrelationship between the attributes and elements of an XML object, i.e., proper syntax for a document and data. Using a schema included in a document, an XML parser can ensure that the remainder of the document follows the rules set forth in the schema, i.e., validation. This is useful to ensure that a given document conforms to an agreed-upon format. However, the schemas are designed to be flexible for users to create their own documents and thus, multiple schemas are often prevalent. Accordingly, multiple schemas require different types of validation and the validations are not mutually exclusive.

When an XML document has an associated schema, the parser will make sure that the document follows the rules of the schema. If the document does not follow the rules established by the schema, an error occurs. This is useful because it can verify that the document conforms to a particular desired structure, i.e., validate the document.

Software programs known in the art are used to validate XML documents. For example, Oracle Corporation has developed the XSDValidator and SAXParser to validate XML documents, each in their respective methods. However, the conventional validation software functions best when the documents conform to a single schema.

The conventional validation software has several drawbacks and disadvantages. For example, the conventional validation software may not correctly validate a document that has associated multiple languages. More particularly, a document may require multiple schemas. The conventional validation software may correctly validate one schema but not validate the rest of the schemas even though rest of the schemas may be correctly formed.

Moreover, although verification against a known syntax and structure is useful, it often is not sufficient for verifying that a document is valid against structure and semantics. Generally, a more complex set of logic is often applied to confirm that a document is valid in the sense that data contained therein conforms to real-world limitations. For example, one might check that the description is a known description, or that a product is in stock, or that an order doesn't exceed a credit limit. Accordingly, conventional validation software typically cannot apply the higher logic to documents, much less to documents that have associated multiple schemas or languages.

SUMMARY OF THE INVENTION

An embodiment of the invention generally relates to a method of processing data. The method includes receiving a multi-language document and determining a profile associated with the multi-language document. The method also includes determining associated schemas and rule files with the profile and applying said associated schemas and rule files to the multi-language document.

Another embodiment of the invention generally pertains to a system for processing data. The system includes a schema database configured to store schemas and rules files and a profile database configured to store document profiles. The system also includes a validation component configured to receive a multi-language document, determine a profile for the multi-language document, and determine associated schemas and rules with the profile.

Yet another embodiment generally relates to a computer readable storage medium on which is embedded one or more computer programs. The one or more computer programs implement a method of processing data. The one or more computer programs include a set of instructions for receiving a multi-language document and determining a profile associated with the document. The one or more computer programs also include instructions for determining associated schemas and rule files with the profile and applying said associated schemas and rule files to the multi-language document.

BRIEF DESCRIPTION OF THE DRAWINGS

While the specification concludes with claims particularly pointing out and distinctly claiming the present invention, it may be believed the same will be better understood from the following description taken in conjunction with the accompanying drawings, which illustrate, in a non-limiting fashion, the best mode presently contemplated for carrying out the present invention, and in which like reference numerals designate like parts throughout the figures, wherein:

DETAILED DESCRIPTION OF THE EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, many types of validation systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to validating documents and data. More specifically, a validation component may be configured to process mixed-language documents and the associated data. A document may have associated multiple languages, e.g., XML, HTML, XHTML, XSLT etc., as well as multiple schemas, e.g., Relax NG, Schematron, W3C XML Schema, etc. The validation component may be configured to receive a document and determine a profile for the document. The profile may be linked to the associated schemas for the particular document. The profile may also be linked to rules files. The rules files may provide a mechanism to check for anomalies in the data in the document base on predetermined rules. For example, the received document may be a payroll document for a French employee with a salary of $30,000 as an account in a multi-national company. A rule in the rules files for this document may specify that French accountants in the multi-national company may not be paid more than $25,000. The validation component would then flag this error or anomaly. Thereby, the validation component may also be used to validate data as well as the format of a document.

The validation component may also be configured to apply the associated schemas and rules files to the document in a sequential fashion to detect anomalies. The validation component may be further configured to track the detected anomalies for the document in a data structure and to present the anomalies to a user in a predetermined format. Alternatively, in other embodiments, the validation component may log the anomalies in a data logger for later analysis.

In yet other embodiments, the validation component may place a return path to the location in the document for each detected anomaly. More particularly, the validation component may place a return path tag, e.g., an XPATH attribute, on the detected anomaly that allows a user to return to a location in the source document to view the error.

Figure 1:
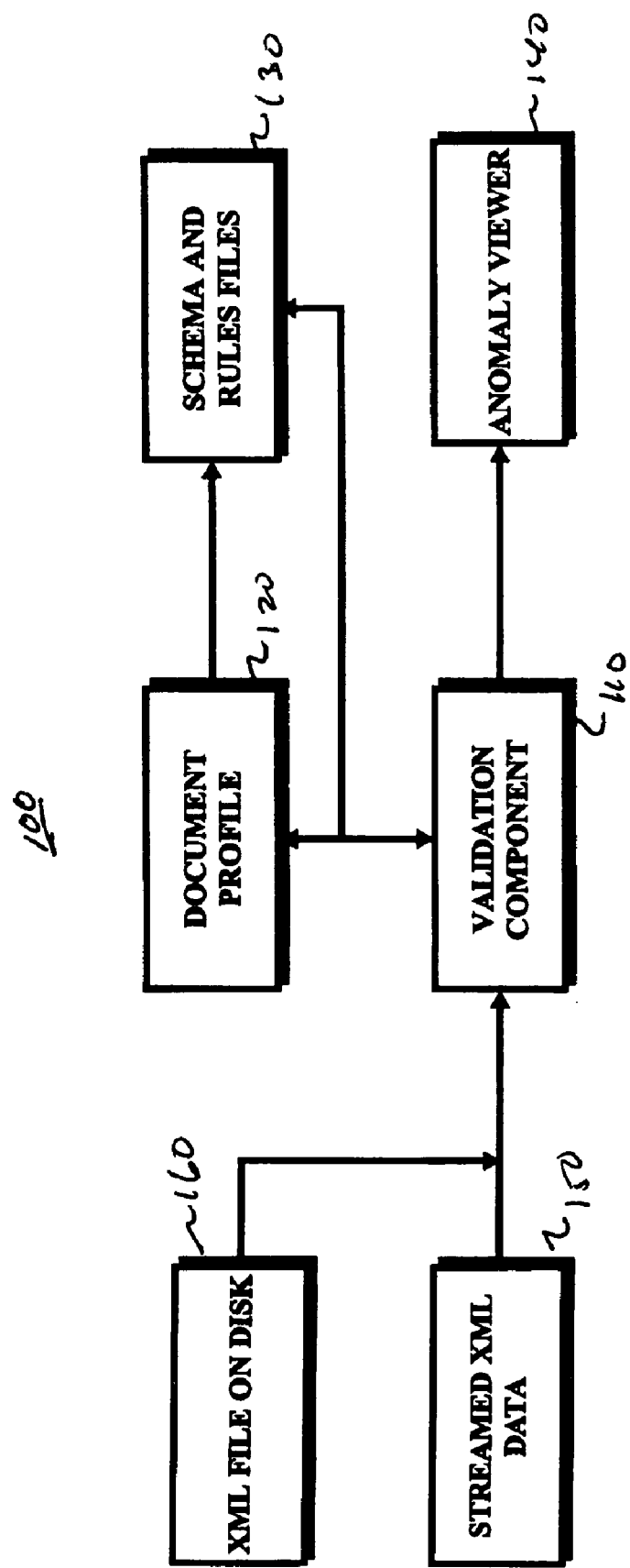
FIG. 1 illustrates a system in accordance with an embodiment of the invention.

FIG. 1 illustrates a block diagram of a system 100 implementing a validation component in accordance with an embodiment of the invention. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or a combination thereof.

As shown in FIG. 1, the system 100 includes a validation component 110, a document profile module 120, a schema and rules files module 130 and an anomaly viewer 140. The validation component 110 may be configured to receive a document as streamed XML data 150 or from XML file on disk 160. In some embodiments, the document may be forwarded to the validation component 110 as parsed data for subsequent processing. In other embodiments, a document may be forwarded as a complete document to be parsed and then subsequently processed by the validation component 110.

Documents may be forwarded to the validation component 110 over a network, e.g., a local area network, a wide area network, or some combination thereof. The documents may also be forwarded to the validation component from a persistent memory storage device over internal computer busses such as EISA, SCSI, FIREWIRE, or the like.

The validation component 110 may be configured to determine a document profile for the received document. In some embodiments, a parser (not shown) may be used to parse the received document to determine a namespace and/or document type definition (DTD) declaration for the received document. The validation component 110 may also be configured to match the retrieved document profile with stored document profiles in the document profile module 120. Each document profile may be configured to point to a variety of schema and rules files that can be used for different types of documents. The document profiles may be explicitly defined by the users/software developers prior to operation of the system, implicitly determined by the system at runtime, or a combination thereof.

The schemas and rules files associated with document profiles are stored in the schema and rules files module 130. The schema and rules files module 130 may be a data structure, e.g., a linked list, a database, or other similar memory construct, configured to store the schema and rules files created by users/administrators of the system 100. The schema and rules files 130 may be accessed using conventional memory access techniques.

The validation component 110 may then apply the associated schemas and rules files to the document in a sequential manner. If the format of the document or a data item contained in the document does not conform to the associated schema and rules files, respectively, the validation component 110 may store the anomaly for later viewing (or analysis) in the anomaly viewer 140. The validation component 110 validates the documents for syntax and structure against the schemas. The validation component 110 may also validate the data contained in the document against rules files to determine whether the data is correct.

The anomaly viewer 140 may be configured to store anomalies detected by the validation component 110. The anomaly viewer 140 may also be configured to format the anomalies into a predetermined format. In some embodiments, the anomaly viewer 140 may be further configured to place a return path tag, e.g., an "XPATH" attribute, allowing the user to return to the location in the source document where the error occurred. The return path tag provides a means for standardized anomaly processing. More particularly, each schema and/or rule stored by the system 100 may generate a different output and thereby requiring the need for a single predetermined output format. The return path tag then provides a mechanism to return to the source document without regard to the schemas and/or rules.

Figure 2:
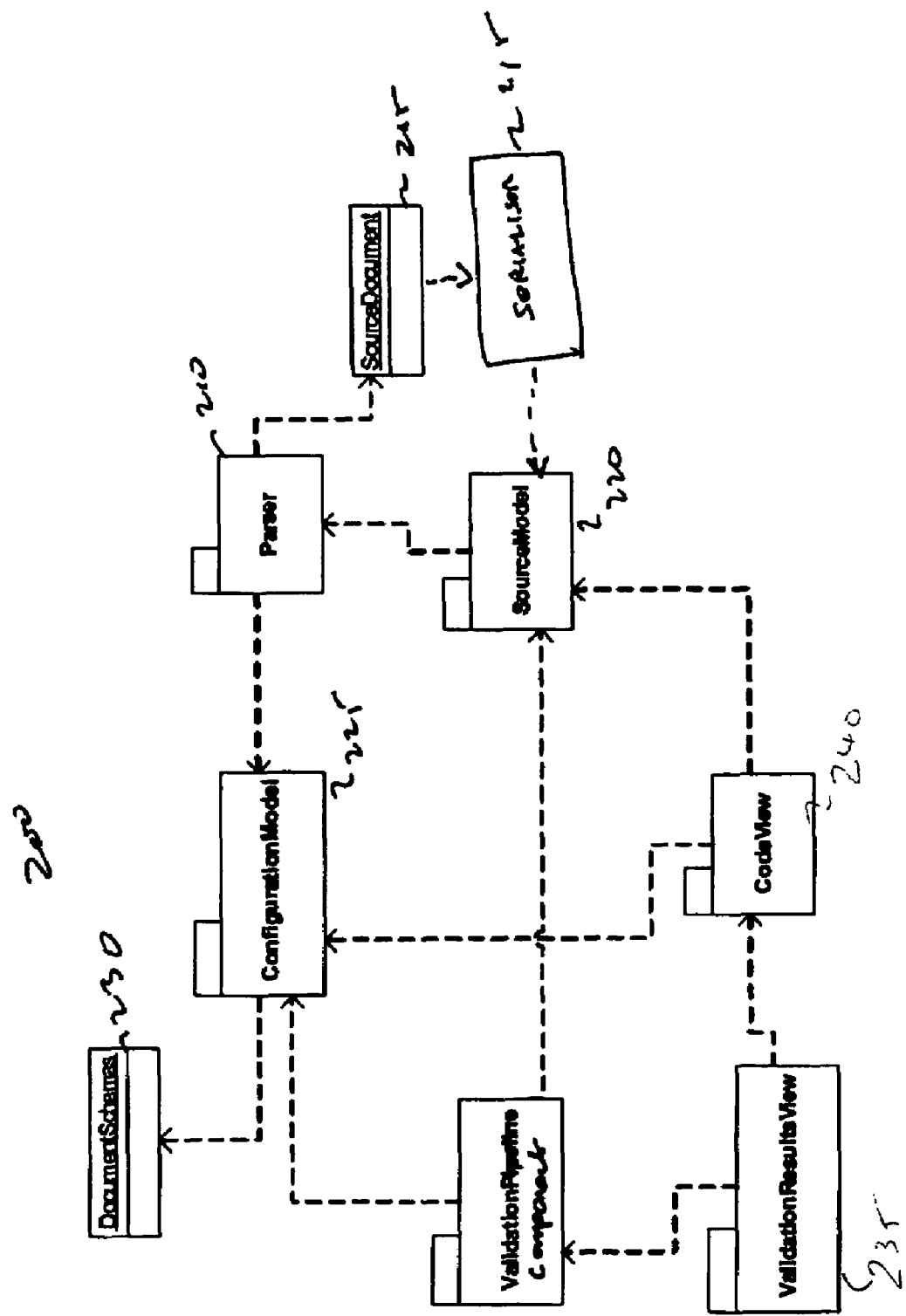
FIG. 2 illustrates a block diagram of an architecture for the validation component in accordance with another embodiment of the embodiment.

FIG. 2 illustrates a block diagram of an architecture 200 for the validation component 110, shown in FIG. 1, in accordance with another embodiment of the invention. It should be readily apparent to those of ordinary skill in the art that the architecture 200 depicted in FIG. 2 represents a generalized schematic illustration and that other components may be added or existing components may be removed or modified. Moreover, the architecture 200 may be implemented using software components, hardware components, or a combination thereof.

As shown in FIG. 2, the architecture 200 includes a source document 205, a parser 210, a serializer 215, a source model 220, a configuration model 225, and document schemas 230. The source document may be the underlying file stored on persistent or non-persistent memory, e.g., a disk or memory, respectively. The source document may be XML or a near XML-language such as HTML or JSP. The standards implemented by the source document 205 may be dependent on the parser 210 and the source model 220.

The parser 210 may be, but is not limited to being, configured to convert the bytes of a source document into tokens and structures for the source model 220. In some embodiments, conventional parsers, e.g., Apache Xerxes SAX parser, may be used to implement parser 210.

The serializer 215 may be, but is not limited to being, configured to convert the tokens and data structures in a source model 220 into a document. In some embodiments, conventional serializers in libraries such as Apache Xerces or custom built serializes may be used to implement serializer 215.

The source model 220 may be, but is not limited to being, configured to be tightly coupled with the serializer 215 and the parser 210. The source model 220 may also be configured to provide a data structure that represents the source document 205 in programmatic data structures, e.g., trees, arrays, or other similar construct. In some embodiments, when the parser is a conventional parser, the source model 220 may be implemented with an industry standard model, e.g., W3C DOM. In other embodiments, customized data structures in the source model 220 along with customized parsers 205 and serializers 210 may provide for greater flexibility in processing non-XML documents and maintaining information not contained in an industry standard data structure.

The configuration model 225 may be, but is not limited to being, configured to manage the document profiles and schemas as well as to implicitly determine a document profile based on the contents of the document.

The configuration model 225 may also be configured to contain the visual representation of XML elements and attributes for the system 100, shown in FIG. 1. The configuration model 225 may be based on information contained in document schemas 230. Accordingly, the configuration model 225 may function as a "Rosetta Stone" or a central repository for metadata. The configuration model 225 may be explicitly defined by the users/software developers prior to operation of the system, implicitly determined by the system at runtime, or a combination thereof.

The document schemas 230 may be configured to store the schemas for each language, e.g., XHTML, XSLT, XFORMS, etc., supported by the validation component. The schemas stored in the document schemas 230 may be a variety of industry standard languages, W3C XML schema, RelaxNG, DTD ("document type definitions"), Schematron, W3C CSS Validator, W3C Accessibility Checker, etc. The schemas provide supplemental information to the configuration model 225.

In certain embodiments, a validation result view module 235 may be provided in the system 200. The validation result view module 235 may provide a means for a user to view display all the anomalies and allow back-linking through the code view module 240 through the embedded return path tag. For example, in a data center setting, the validation result view module may be implemented as a user-friendly interface that shows critical anomalies to system administrators and non-critical anomalies to end users. In other embodiments of system 200, the validation results view may not exist or may simply display underlying document with errors highlighted.

Figure 3:
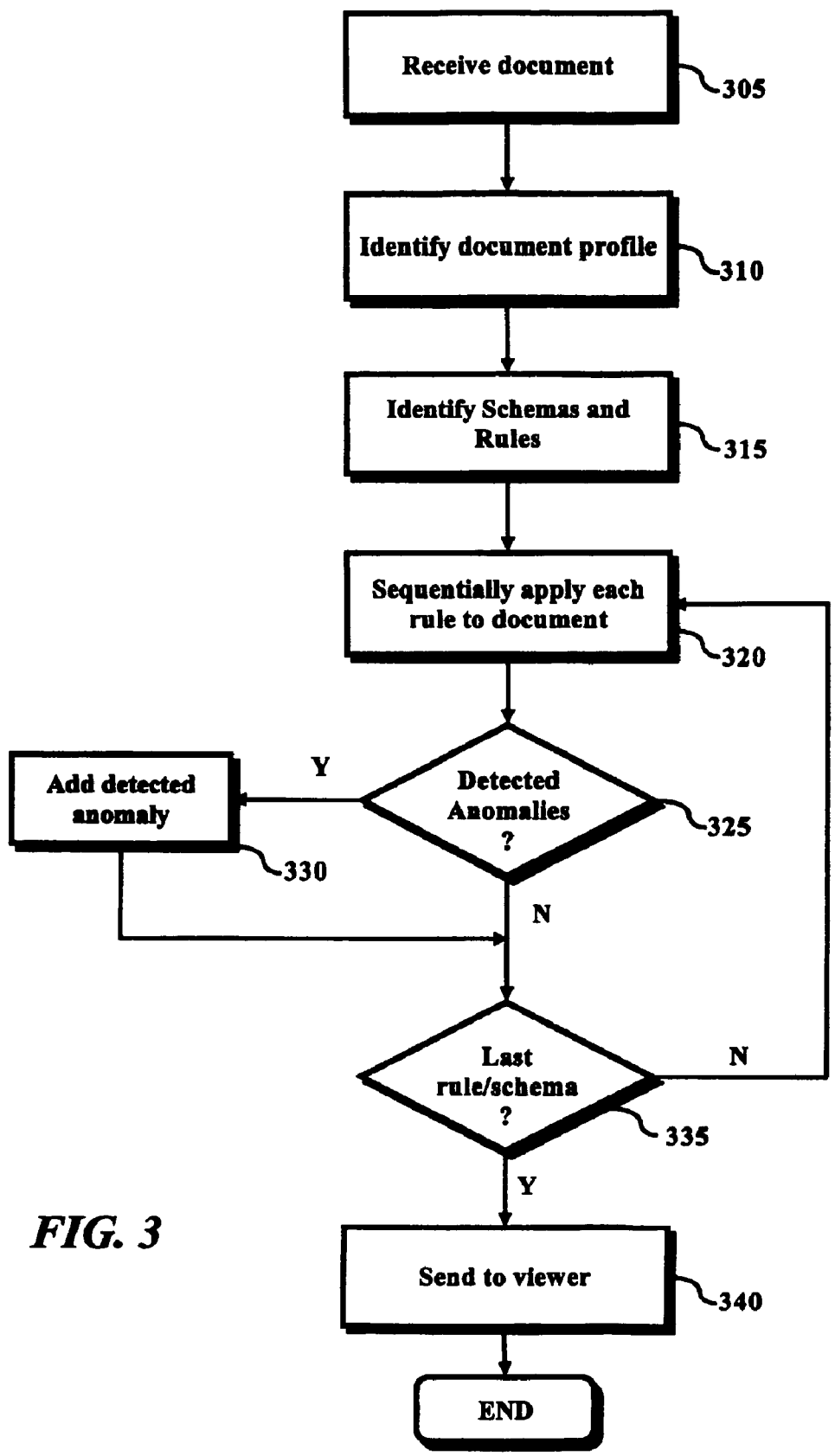
FIG. 3 illustrates a flow diagram for the validation component shown in FIG. 1 in accordance with yet another embodiment of the invention.

FIG. 3 illustrates a flow diagram 300 for the validation component 110 shown in FIG. 1 in accordance with yet another embodiment of the invention. It should be readily apparent to those of ordinary skill in the art that this flow diagram 300 represents a generalized illustration and that other steps may be added or existing steps may be removed or modified.

As shown in FIG. 3, the validation component 110 may receive an XML or near XML document, in step 305. The parser 210 may be configured to parse the received document and form a source model of the received document.

In step 310, the validation component 110 may be configured to identify a document profile for the received document. More particularly, the validation component 110 may parse the received document. The validation component 110 may then examine the tokens and data structures to determine the namespace and/or DTD declarations. The validation component 110 may then select a profile from the document profile module 120 based on the namespace and/or DTD declarations.

In step 315, the validation component 110 may be configured to determine the associated schemas and/or rules files for the selected document profile. Each document profile contains links to the applicable schemas and/or rules files stored in the schema and rules files module 130.

In step 320, the validation component 110 may be configured to apply each identified associated schema and/or rules files to the document For each schema and/or rules file, the validation component 110 validates the appropriate section of the document against the selected schema and/or rules files.

For each rule and/or schema, if the validation component 110 detects an anomaly, in step 325, the validation component 110 may temporarily store the anomaly in a data structure configured to store anomalies, in step 325. In certain embodiments, the validation component 110 may add a XPATH tag, i.e., a return path tag, for a user to identify the location of the anomaly in the source document.

Otherwise, if the validation component 110 fails to detect an anomaly, the validation components tests if the last identified rules file and/or schema has been reached, in step 335. If the last schema and/or rule has not reached, the validation component 110 may be configured to return to the processing of step 320.

Otherwise, if the validation component 110 has reached the last schema and/or rules file, the validation module 110 may be configured to forward the aggregated anomalies to the anomaly viewer 140, shown in FIG. 1, in step 340. Subsequently, the validation component 110 terminates processing and may return to an idle state.

After receiving the aggregated anomalies, i.e., a list of anomalies in a standardized form independent of the schema processor, the anomaly viewer 140 may be configured present the anomalies in a predetermined format. In other embodiments, the anomaly viewer 140 may function as data logger to store the anomalies for later analysis.

Figure 4:
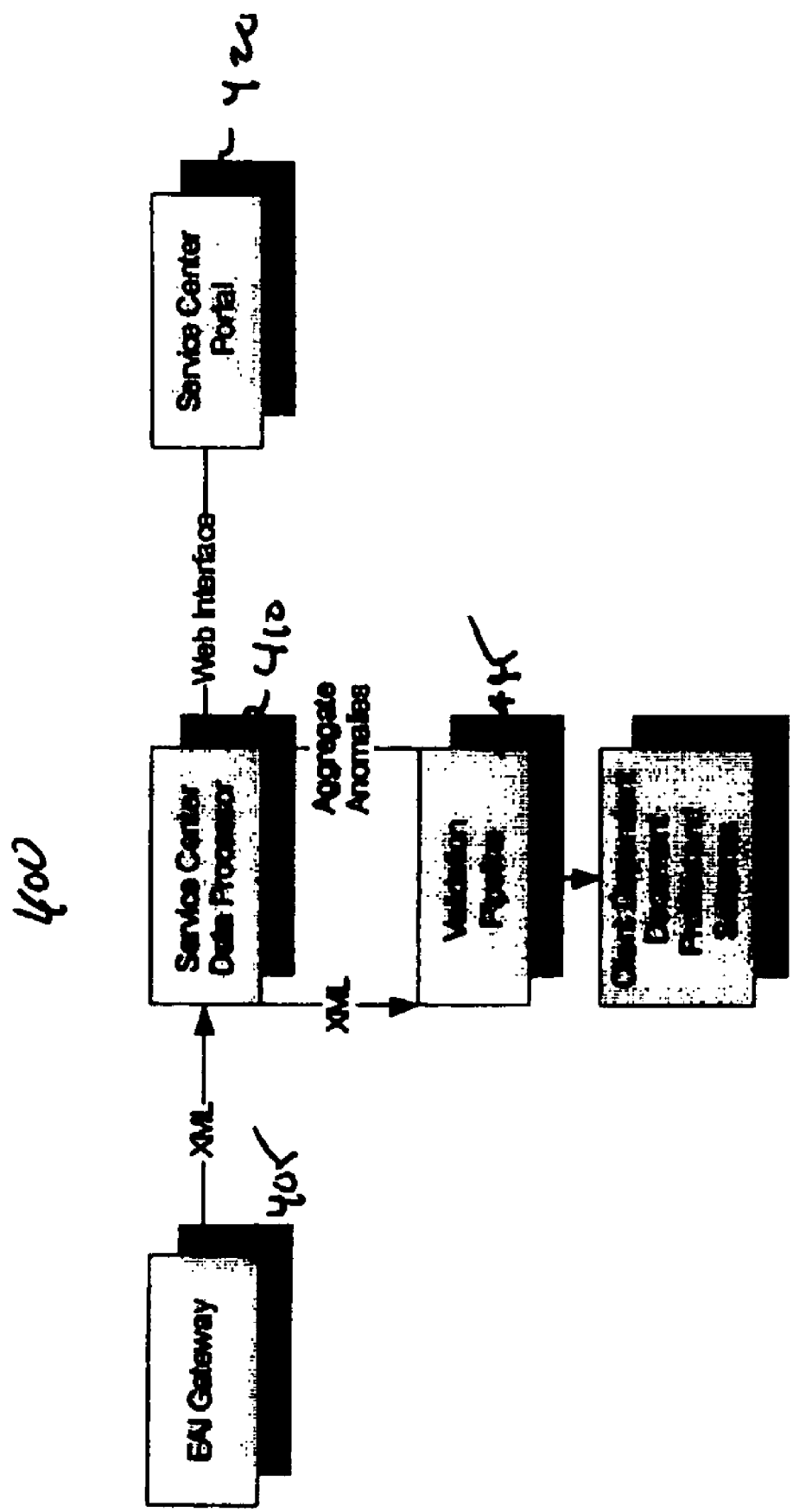
FIG. 4 illustrates another system utilizing the validation component in accordance with yet another embodiment.

FIG. 4 illustrates a service center system 400 using the validation component in accordance with yet another embodiment of the invention. It should be readily apparent to those of ordinary skill in the art that the system 400 depicted in FIG. 4 represents a generalized schematic illustration and that other components may be added or existing components may be removed or modified. Moreover, the system 400 may be implemented using software components, hardware components, or a combination thereof.

As shown in FIG. 4, the service center system 400 includes an EAI gateway 405, a service center data processor 410, a validation component 415, and a service center portal 420. The EAI ("Enterprise Application Integration") gateway 405 may be configured to provide a mechanism to receive data from a wide variety of sources and receive the data in a common format. An example of an EAI gateway may be EAI applications by webMethods, IBM, etc. In this embodiment, the common format would be an XML stream.

The service center data processor 410 may be configured to contain a number of software processes, e.g., call center functionality, help desk services, etc. The service center data processor 410 also contains a software process to execute validation of incoming documents.

The validation component 415 may be executed when called by the service center data processor 410. In this embodiment, the validation component uses document profiles, schemas and rules files specifically designed for the service center system 400. For example, if the service center system 400 services payroll clients, the document profiles, schemas and rules files would be related to process payroll documents. Similarly, if the service center system 400 services insurance claims, the document profiles, schemas and rules files would be related to processing insurance claims.

The service center portal 420 may be configured to provide users in the service center system 400 a user-friendly mechanism to view resulting anomalies from the validation process of the validation component 415. Since the anomaly results passed back from the validation component 415 may be the same regardless of where the initial XML originated and in which step in the validation component 415 the anomaly was detected, the users of the service center may uniformly manage the system 300 and the clients.

Figure 5:
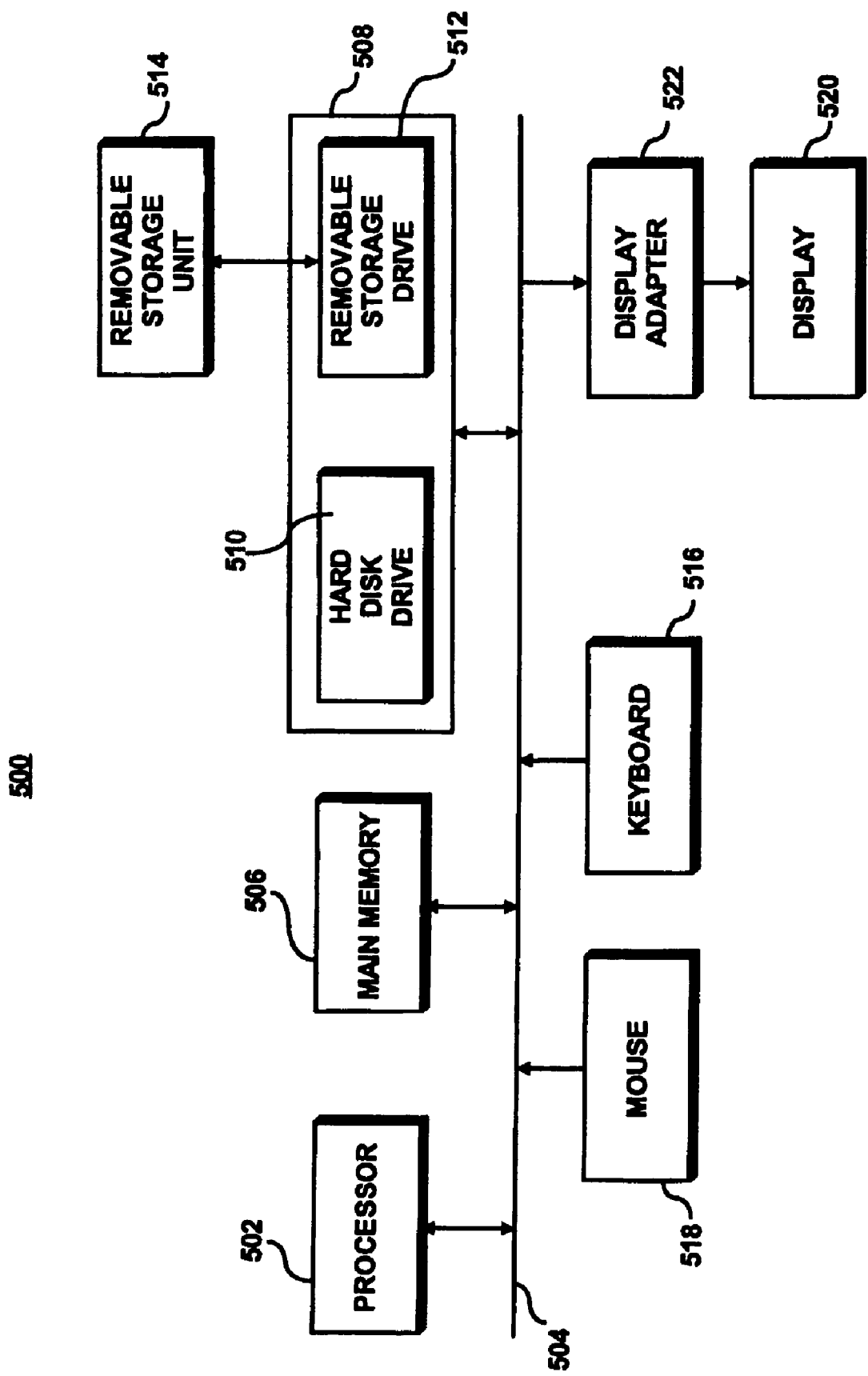
FIG. 5 illustrates a computer system implementing the validation module in accordance with yet another embodiment.

FIG. 5 illustrates a computer system implementing the validation component 110 in accordance with yet another embodiment of the invention. The functions of the validation component 110 may be implemented in program code and executed by the computer system 500. The validation component 110 may be implemented in computer languages such as C#, C, C++, JAVA, etc.

As shown in FIG. 5, the computer system 500 includes one or more processors, such as processor 502, that provide an execution platform for embodiments of the validation component 110. Commands and data from the processor 502 are communicated over a communication bus 504. The computer system 500 also includes a main memory 506, such as a Random Access Memory (RAM), where the software for the validation component 110 may be executed during runtime, and a secondary memory 508. The secondary memory 508 includes, for example, a hard disk drive 510 and/or a removable storage drive 512, representing a floppy diskette drive, a magnetic tape drive, a compact disk drive, or other removable and recordable media, where a copy of a computer program embodiment for the validation component 110 may be stored. The removable storage drive 512 reads from and/or writes to a removable storage unit 514 in a well-known manner. A user interfaces with the validation component 110 with a keyboard 516, a mouse 518, and a display 520. The display adaptor 522 interfaces with the communication bus 504 and the display 520 and receives display data from the processor 502 and converts the display data into display commands for the display 520.

Certain embodiments may be performed as one or more computer programs. The computer program may exist in a variety of forms both active and inactive. For example, the computer program can exist as software program(s) comprised of program instructions in source code, object code, executable code or other formats; firmware program(s); or other known program. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals arriving from the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

The invention claimed is:

1. A method of processing data using a computer, the method comprising:
   using the computer to receive a multi-language document, said multi-language document comprising a numeric data value, wherein the computer is configured using computer executable instructions operable to configure the computer to:
   1) receive said multi-language document as streamed data; and
   2) receive said multi-language document as a filed stored on a computer memory;
   using the computer to determine a document profile associated with the multi-language document, wherein the computer is configured with computer executable instructions operable to configure the computer to determine a plurality of namespace and document type definition declarations in the multi-language document, and to determine the document profile based on one or more namespaces or document type definition declarations;
   using the computer to determine schemas and rule files associated with the document profile by using a link contained in the document profile associated with the multi-language document;
   using the computer to apply said schemas and rule files to the multi-language document, wherein using the computer to apply said associated schemas comprises validating a first section of said multi-language document for compliance with syntax and structure against a first schema from said schemas and validating a second section of said multi-language document for compliance with syntax and structure against a second schema from said schemas wherein said first schema requires a first type of validation, and said second schema requires a second type of validation;
   using the computer to apply said rule files to the multi-language document, wherein applying said rule files to the multi-language document comprises comparing the numeric data value comprised in the multi-language document as received with a rule specifying a range of acceptable values for said numeric data value; and
   using the computer to present a list of anomalies determined by the application of the schemas and rule files to a user in a single format, wherein the computer is configured with instructions operable to configure the computer to receive a plurality of anomalies in a plurality of different formats and to convert the plurality of anomalies into the single format for presentation.

2. The method of processing data using a computer according to claim 1, further comprising:
using the computer to determine an anomaly based on a data item contained in the multi-language document not matching a condition specified in the rules files.

3. The method of processing data using a computer according to claim 2, further comprising:
using the computer to append the anomaly to a list of anomalies.

4. The method of processing data using a computer according to claim 2, further comprising:
using the computer to append a return path tag for the anomaly in the list of anomalies.

5. The method of processing data using a computer according to claim 1, further comprising:
using the computer to determine an anomaly based on the multi-language document not conforming to at least one associated schema.

6. The method of processing data using a computer according to claim 1, wherein determination of the profile associated with the multi-language document further comprises:
using the computer to create a database of schemas and rule files; analyzing a test document for the multi-language document;
and using the computer to link the associated schemas and rule files based on the analysis of the test document.

7. The method of processing data using a computer according to claim 6, further comprising:
using the computer to store the profile in a profile database.

8. The method of processing data using a computer according to claim 1, wherein determination of the profile associated with the multi-language document further comprises:
using the computer to parse the multi-language document;
using the computer to analyze a namespace of an associated metadata of the multi-language document; and
using the computer to select the profile based on the namespace.

9. A computer readable storage medium on which is embedded one or more computer programs, the one or more computer programs implementing a method of processing data, the one or more computer programs comprising a set of instructions for:

a) receiving a multi-language document, said multi-language document comprising a numeric data value, wherein the instructions for receiving a multi-language document comprise instructions operable to configure a computer to:
1) receive said multi-language document as streamed data; and
2) receive said multi-language document as a file stored on a computer memory;
b) determining a profile associated with the multi-language document, wherein the instructions for determining a profile associated with the multi-language document comprise instructions operable to configure the computer to determine a plurality of namespace and document type definition declarations in the multi-language document, and further comprises instructions operable to determine the profile based on one or more namespaces or document type definition declarations;
c) determining schemas and rule files associated with the profile by using a link contained in the profile associated with the multi-language document;
d) applying said schemas to the multi-language document, wherein applying the schemas to the multi-language document comprises validating a first section of said multi-language document for compliance with syntax and structure against a first schema from said schemas and validating a second section of said multi-language document for compliance with syntax and structure against a second schema from said schemas wherein said first schema requires a first type of validation, and said second schema requires a second type of validation;
e) applying said rule files to the multi-language document, wherein applying said rule files to the multi-language document comprises comparing the numeric data value comprised in the multi-language document as received with a rule specifying a range of acceptable values for said numeric data value; and
f) presenting a list of anomalies determined by the application of the schemas and rule files to a user in a single format wherein the instructions for presenting the list of anomalies comprise instructions for receiving a plurality of anomalies in a plurality of different formats, and for converting the plurality of anomalies into the single format for presentation.

* * * * *